US012018479B2

(12) United States Patent
Zhang et al.

(10) Patent No.: US 12,018,479 B2
(45) Date of Patent: Jun. 25, 2024

(54) MULTI-FUNCTION ECOLOGICAL EXTERIOR WALL AND PREPARATION METHOD THEREFOR

(71) Applicant: SHANXI TIANHE NEW MATERIAL TECHNOLOGY CO., LTD., Yangquan (CN)

(72) Inventors: Suogui Zhang, Yangquan (CN); Guoliang Sun, Yangquan (CN); Ruigang Zhang, Yangquan (CN); Yixing Deng, Yangquan (CN); Dake Wang, Yangquan (CN)

(73) Assignee: SHANXI TIANHE NEW MATERIAL TECHNOLOGY CO., LTD., Yangquan (CN)

( * ) Notice: Subject to any disclaimer, the term of this patent is extended or adjusted under 35 U.S.C. 154(b) by 138 days.

(21) Appl. No.: 17/274,243

(22) PCT Filed: Aug. 21, 2020

(86) PCT No.: PCT/CN2020/110433
§ 371 (c)(1),
(2) Date: Mar. 8, 2021

(87) PCT Pub. No.: WO2021/032183
PCT Pub. Date: Feb. 25, 2021

(65) Prior Publication Data
US 2022/0170263 A1 Jun. 2, 2022

(30) Foreign Application Priority Data
Aug. 21, 2019 (CN) .......................... 201910774332.8

(51) Int. Cl.
*E04B 1/12* (2006.01)
*B32B 5/18* (2006.01)
(Continued)

(52) U.S. Cl.
CPC .................. *E04B 1/90* (2013.01); *B32B 5/18* (2013.01); *B32B 18/00* (2013.01); *C04B 35/013* (2013.01);
(Continued)

(58) Field of Classification Search
CPC ... E04B 1/12; E04B 1/14; E04B 1/942; E04B 1/90; E04B 2/02; E04B 2/04; Y02B 80/32
See application file for complete search history.

(56) References Cited

U.S. PATENT DOCUMENTS 7,546,712 B2 * 6/2009 Shaw ........................ E04B 2/18
52/439
8,739,497 B2 * 6/2014 Meuser ................. E04D 11/002
52/302.1
(Continued)

FOREIGN PATENT DOCUMENTS

| CN | 102417368 A |   | 4/2012 |
|----|-------------|---|--------|
| CN | 102417368 A | * | 4/2012 |

(Continued)

OTHER PUBLICATIONS

PCT International Search Report and Written Opinion for International Application No. PCT/CN2020/110433, dated Nov. 25, 2020, 8 pages.

*Primary Examiner* — Ryan D Kwiecinski
(74) *Attorney, Agent, or Firm* — Hoffman Warnick LLC (57) ABSTRACT

The disclosure discloses a method for preparing a multi-functional ecological exterior wall, including: preparing a ceramic board of a ceramic thermal insulation waterproof layer; preparing a ceramic sound-absorbing board of a sound-absorbing layer; and installing a ecological exterior wall: leveling a surface of the wall of a building with cement slurry, and applying a cement bonding layer thereon; laying the ceramic thermal insulation waterproof board on the
(Continued)

cement bonding layer, and applying the cement bonding layer on the ceramic board; laying the ceramic sound-absorbing board on the cement bonding layer and reserving a gap used to place a pipe; driving the screw-thread steel bolt from the surface of the ceramic sound-absorbing board into the wall obliquely; installing and fixing the pipe in the gap, which is reserved at the upper of the ceramic sound-absorbing board; planting a green plant on the surface of the ceramic board of the sound-absorbing layer.

9 Claims, 5 Drawing Sheets

(51) Int. Cl.
| | |
|---|---|
| B32B 18/00 | (2006.01) |
| C04B 35/01 | (2006.01) |
| C04B 35/18 | (2006.01) |
| C04B 35/622 | (2006.01) |
| C04B 38/00 | (2006.01) |
| E04B 1/14 | (2006.01) |
| E04B 1/90 | (2006.01) |
| E04B 2/02 | (2006.01) |
| E04B 2/04 | (2006.01) |
| B01J 6/00 | (2006.01) |

(52) U.S. Cl.
CPC ........ *C04B 35/18* (2013.01); *C04B 35/62204* (2013.01); *C04B 38/0067* (2013.01); *E04B 2/04* (2013.01); *B01J 6/001* (2013.01); *B32B 2250/02* (2013.01); *B32B 2250/03* (2013.01); *B32B 2266/053* (2016.11); *B32B 2266/08* (2013.01); *B32B 2307/102* (2013.01); *B32B 2307/304* (2013.01); *B32B 2307/72* (2013.01); *B32B 2307/7265* (2013.01); *B32B 2607/00* (2013.01); *C04B 2201/20* (2013.01); *C04B 2201/30* (2013.01)

(56) References Cited

U.S. PATENT DOCUMENTS

| 9,574,341 | B2 * | 2/2017 | Ciuperca | E04B 2/58 |
| 11,015,345 | B1 * | 5/2021 | Smith | E04B 2/04 |
| 2022/0170263 | A1 * | 6/2022 | Zhang | E04B 1/665 |

FOREIGN PATENT DOCUMENTS

| CN | 102515823 | A |   | 6/2012 | |
| CN | 102515823 | A | * | 6/2012 | |
| CN | 102912874 | A |   | 2/2013 | |
| CN | 102912874 | A | * | 2/2013 | |
| CN | 103334504 | A | * | 10/2013 | |
| CN | 203499097 | U | * | 3/2014 | |
| CN | 106478043 | A | * | 3/2017 | |
| CN | 107043274 | A | * | 8/2017 | |
| CN | 107043274 | A |   | 8/2017 | |
| CN | 107382363 | A | * | 11/2017 | |
| CN | 107382363 | A |   | 11/2017 | |
| CN | 208039518 | U | * | 11/2018 | |
| CN | 208039518 | U |   | 11/2018 | |
| CN | 108929085 | A | * | 12/2018 | ........... C04B 20/023 |
| CN | 109156235 | A |   | 1/2019 | |
| CN | 109156235 | A | * | 1/2019 | |
| CN | 109235692 | A | * | 1/2019 | ........... E04B 1/7604 |
| CN | 109354305 | A | * | 2/2019 | ........... B01J 23/002 |
| CN | 208981696 | A |   | 6/2019 | |
| CN | 208981696 | U | * | 6/2019 | |
| CN | 110344519 | A |   | 10/2019 | |
| CN | 110344519 | A | * | 10/2019 | ............. B28B 11/00 |
| CN | 210658802 | U | * | 6/2020 | ............. B28B 11/00 |
| CN | 211817555 | U | * | 10/2020 | |
| CN | 113880552 | A | * | 1/2022 | |
| CN | 215992220 | U | * | 3/2022 | |
| CN | 216545083 | U | * | 5/2022 | |
| CN | 114775846 | A | * | 7/2022 | |
| CN | 217389597 | U | * | 9/2022 | |
| CN | 114342699 | B | * | 1/2023 | |
| CN | 218897691 | U | * | 4/2023 | |
| CN | 219671424 | U | * | 9/2023 | |
| DE | 102006028840 | A1 | * | 1/2007 | ............... E04B 2/04 |
| DE | 202022101757 | U1 |   | 5/2022 | |
| EP | 2505730 | A1 | * | 10/2012 | ............... E04B 2/04 |
| EP | 2913454 | A1 | * | 9/2015 | ............... E04B 1/14 |
| EP | 4174244 | A1 | * | 5/2023 | ............... A01G 9/025 |
| FR | 2981538 | A1 | * | 4/2013 | ......... A01G 13/0268 |
| JP | 2004344143 | A | * | 12/2004 | |
| JP | 2005204554 | A | * | 8/2005 | |
| KR | 20170099798 | A |   | 9/2017 | |
| WO | WO-2006040110 | A1 | * | 4/2006 | ............... E04B 2/04 |
| WO | WO-2021181117 | A1 | * | 9/2021 | ............... E04B 7/22 |
| WO | WO-2021206572 | A1 | * | 10/2021 | |
| WO | WO-2021214344 | A1 | * | 10/2021 | ............. A01G 9/033 |
| WO | WO-2022010355 | A1 | * | 1/2022 | |

* cited by examiner

MULTI-FUNCTION ECOLOGICAL EXTERIOR WALL AND PREPARATION METHOD THEREFOR

CROSS REFERENCE TO RELATED APPLICATION

This application claims the priority of Chinese Patent Application No. CN201910774332.8, entitled "Multifunctional ecological exterior wall and preparation method thereof" filed with the China National Intellectual Property Administration on Aug. 21, 2019, which is incorporated herein by reference in its entirety.

TECHNICAL FIELD

The present disclosure relates to the field of environmentally-friendly building materials, in particular to a multifunctional ecological exterior wall and a preparation method thereof.

BACKGROUND ART

With the development of China's industrialization and the increase of the intensity of natural development, the environmental problems have become increasingly worse. It is mainly reflected in the large accumulation of industrial solid wastes which pollutes land and water bodies and also results in noise and light pollution, and also reflected in uneven distribution of water resources caused by climate change which brings problems that the air is too dry in the north and is too humid in the south. On the other hand, due to the improvement of living standards, people have higher and higher requirements for the comfort of houses. Therefore, it is particularly important to do a good job in thermal insulation of building exterior wall.

At present, solid wastes are mainly treated by landfill, which causes environmental pollution and cannot make full use of resources. In the terms of thermal insulation of building exterior walls, polystyrene board or rock wool is usually used as the thermal insulation layer, but the former cannot meet the requirements of fire prevention, and the latter cannot meet the requirements of waterproof. Moreover, there are no effective measures to reduce the noise pollution for the building and solve the dry air problem around the building.

SUMMARY

An object of the present disclosure is to provide a multifunctional ecological exterior wall, which can not only meet the requirements of thermal insulation, fire prevention, waterproof and noise isolation of buildings, but also adjust the humidity of surrounding air, increase negative oxygen ions and make decorations and greening.

Another object of the present disclosure is to provide a method for preparing a multifunctional ecological exterior wall, in which industrial waste coal gangue and fly ash are used as raw materials, and therefore the method is energy-saving and pollution-free.

The technical solution of the present disclosure is a method for preparing a multifunctional ecological exterior wall, comprising the following steps:

step 1: preparing a ceramic thermal insulation waterproof board as a ceramic thermal insulation waterproof layer;

step 2: preparing a ceramic sound-absorbing board as a sound-absorbing layer;

step 3: installing an ecological exterior wall:

step 3.1: leveling the surface of the wall of a building with cement slurry, and applying a cement bonding layer thereon;

step 3.2: laying the ceramic thermal insulation waterproof board on the cement bonding layer in step 3.1, and applying the cement bonding layer on the board;

step 3.3: laying the ceramic sound-absorbing board on the cement bonding layer in step 3.2, and reserving a gap of 3 cm to 5 cm between the uppermost two adjacent rows of ceramic sound-absorbing boards of each floor of the building, which is used to place a water discharging component for adjusting humidity and temperature;

step 3.4: driving a screw-thread steel bolt from the surface of the ceramic sound-absorbing board into the wall obliquely;

step 3.5: installing the water discharging component comprising a pipe made of PVC or a galvanized material in the gap reserved at the upper of the ceramic sound-absorbing board, wherein the pipe is evenly spaced with circular holes with a diameter of 5 mm to 10 mm on its surface, the pipe is closed at one end and is connected to tap water and/or a mist outlet of a water storage device at the other end, wherein the water storage device is fixed onto the exterior wall by a bracket, connected to tap water with a water inlet of the water storage device, and provided with an ultrasonic atomizer inside, which is connected to a power source by a wire, the pipe is externally provided with an electric valve, a temperature sensor, and a humidity sensor, which are connected to a control system, and the pipe is fixed with a galvanized pinch plate;

step 3.6: planting green plants on the surface of the ceramic sound-absorbing board.

The other features of the present disclosure are as follows:

In some embodiments, step 3.3 is alternatively performed as follows: laying the ceramic sound-absorbing board on the cement bonding layer in step 3.2, and reserving a gap of 3 cm to 5 cm at the uppermost row of ceramic sound-absorbing board of each floor of the building, which is used to place a water discharging component for adjusting humidity and temperature.

In some embodiments, the wall of the building in step 3.1 includes, but is not limited to, closed-cell foam ceramic boards with a density of 500 kg/m$^3$ to 700 kg/m$^3$ or cement blocks.

In some embodiments, under the condition that the pipe is connected to the tap water and the mist outlet of the water storage device at the other end, in step 3.5, said end of the pipe is connected to one end of a three-way pipe, while the other two ends of the three-way pipe are connected to the tap water and the mist outlet of water storage device respectively.

In some embodiments, step 1 is specified as follows:

step 1.1: providing 22%-27% by weight of fly ash, 13%-18% by weight of coal gangue, 8%-12% by weight of red mud, 40%-45% by weight of shale, 5%-10% by weight of feldspar and 0.2%-2% by weight of a composite foaming agent for use;

step 1.2: crushing coal gangue and shale respectively with a crusher to particles with a particle size of less than 3 mm, introducing the particles into a ball mill together with fly ash, red mud, feldspar powder, the composite foaming agent and water, and ball milling the resulting mixture to obtain a powdered material;

step 1.3: spray drying and granulating the powdered material obtained in step 1.2 to obtain a dried particle;

step 1.4: loading the dried particle obtained in step 1.3 into a refractory mold, and sending the mold into a kiln for calcining, to obtain a closed-cell foam ceramic board;

step 1.5: cutting the closed-cell foam ceramic board obtained in step 1.4 according to the required specifications, to obtain a ceramic thermal insulation waterproof board.

In some embodiments, the calcining in the kiln in step 1.4 is performed at a temperature of 1150° C. to 1200° C. for 30 to 60 minutes.

In some embodiments, the composite foaming agent in step 1.1 includes any combination of calcium carbonate, calcium sulfate and silicon carbide in any ratio.

In some embodiments, the process of step 2 is as follows:

step 2.1: providing 22%-27% by weight of fly ash, 13%-18% by weight of coal gangue, 8%-12% by weight of red mud, 40%-45% by weight of shale, 5%-10% by weight of feldspar powder, 0.1%-3% by weight of a composite foaming agent, 0.5%-3% by weight of a bonding agent, 7%-12% by weight of a pore forming agent, 0-1% by weight of a surfactant and 1-7% by weight of coal powder for use;

step 2.2: crushing coal gangue and shale respectively by a crusher to particles with a particle size of less than 3 mm, introducing the particles into a ball mill together with fly ash, red mud, feldspar powder, the bonding agent and the composite foaming agent, and ball milling the resulting mixture, to obtain a mixed powder A with a fineness of ≥200 mesh; mixing the mixed powder A with coal powder in a blender, to obtain a mixed powder B;

step 2.3: dissolving the surfactant in water to obtain a colloid with a mass concentration of 10% to 12%, and mixing the colloid and the pore forming agent in a ratio of 1:(30-60) by volume, to obtain a viscose pore forming agent;

step 2.4: adding the mixed powder B into the viscose pore forming agent obtained in step 2.3 while adding water with a continuous stirring, to obtain a spherical particle uniformly coated with the mixed powder B;

step 2.5: injecting the spherical particle obtained in step 2.4 into a mold, pressing lightly to make the particles close to each other, drying naturally until that the particles have a certain strength, and releasing the resulting material from the mold, to obtain a semi-dry blank with a moisture content of 15-25%;

step 2.6: punching the semi-dry blank by a nail plate punching machine, with a hole spacing of about 1 cm to 5 cm, and then drying the semi-dry blank at a temperature of 80° C. to 90° C. to obtain a hard blank;

step 2.7: calcining the hard blank in a kiln at a temperature of 1150° C. to 1200° C. for 20 min to 60 min, and cooling naturally, to obtain an ecological ceramic material with various sound-absorbing structures; and step 2.8: cutting the ecological ceramic material calcined in step 2.7 to obtain a ceramic sound-absorbing board.

Another technical solution of the present disclosure is an ecological wall, comprising, any one or two or three of, from the inside to the outside, a ceramic thermal insulation waterproof layer, a ceramic sound-absorbing layer and a water discharging component, and further a greening layer; the ceramic thermal insulation waterproof layer is bonded to the ceramic sound-absorbing layer through a bonding layer; the greening layer is located on the surface of the ceramic sound-absorbing layer; and a gap paralleling to the ground is provided at the upper of the wall of the ceramic sound-absorbing layer, in which a water discharging component is installed to adjust humidity and temperature.

The ceramic sound-absorbing layer includes at least two rows of rectangular ceramic sound-absorbing boards which are arranged in parallel along the direction parallel to the ground and laid adjacent to each other in sequence; between the upper two adjacent rows of ceramic sound-absorbing boards on the upper part, a gap is provided to install the water discharging component.

The ceramic thermal insulation waterproof layer comprises a closed-cell foam ceramic board with a density of 500 kg/m$^3$ to 700 kg/m$^3$, which has a strength and dry density respectively equivalent to that of B07 aerated concrete blocks and is used as the body structure of the wall.

In some embodiments, the prepared ecological wall comprises a cement block, wherein the inner side of the ceramic thermal insulation waterproof layer is directly bonded to the surface of the cement block through the bonding layer.

The ceramic thermal insulation waterproof layer includes a closed-cell foam ceramic board with a density of 150 kg/m$^3$ to 300 kg/m$^3$.

The ceramic sound-absorbing board of the ceramic sound-absorbing layer is penetrated and fixed onto the cement block by a screw-thread steel bolt; the screw-thread steel bolt penetrates from the outside to the inside, the ceramic sound-absorbing layer, the second bonding layer, the ceramic thermal insulation waterproof layer, and the first bonding layer, and fixes onto the cement block.

In some embodiments, each layer is penetrated and fixed onto the innermost layer by a screw-thread steel bolt, and an angle between the screw-thread steel bolt and the vertical direction of the innermost layer is an acute angle, which ranges from 30° to 75°.

The screw-thread steel bolt is sunk into the outermost wall for about 1 cm to 2 cm, and the counterbore formed between the screw-thread steel bolt inside the outermost wall and the outside is sealed with cement slurry.

In some embodiments, the feature that each layer is penetrated and fixed onto the innermost layer by a screw-thread steel bolt specifically comprises:

the bonding layer and the ceramic sound-absorbing layer are penetrated and fixed onto the ceramic thermal insulation waterproof layer by a screw-thread steel bolt, wherein the ceramic thermal insulation waterproof layer comprises a closed-cell foam ceramic board with a density of 500 kg/m$^3$ to 700 kg/m$^3$, and is used as the body structure of the wall, or the screw-thread steel bolt penetrates from the outside to the inside, the ceramic sound-absorbing layer, the second bonding layer, the ceramic thermal insulation waterproof layer, and the first bonding layer, wherein the ceramic thermal insulation waterproof layer comprises a closed-cell foam ceramic board with a density of 150 kg/m$^3$ to 300 kg/m$^3$.

The present disclosure has the following beneficial effects:

In comparison with traditional exterior walls, the multifunctional ecological exterior wall according to the present disclosure is simpler in structure, and integrates the functions of thermal insulation, fire prevention, waterproof, sound-absorbing and noise reduction, air humidity adjustment, increase of negative oxygen ions, decoration and greening, and dust-absorbing, being an excellent environmentally-friendly material system. The water discharge system automatically adjusts the humidity of the air on the exterior wall depending on changes of ambient humidity and the temperature of the exterior wall, so that the exterior wall has the function of "breathing" and at the same time plays the role of keeping indoor temperature constant; planting green plants on the wall plays a role in greening and beautifying effect. The ecological exterior wall, being made of fly ash, coal gangue solid waste and easily available ordinary materials, has benefits of low cost, resource saving, and easy industrialization and marketization, which can be vigorously promoted and used. Both the thermal insulation layer and the sound-absorbing layer of the ecological exterior wall are made of inorganic sintered materials, have a stable structure, excellent and stable performance, and have the same life span as the building. The method for preparing the ecological exterior wall according to the present disclosure has advantages of green, environmentally-friendly and simple in operation.

In figures, 1 refers to a sound-absorbing layer, 2 refers to a bonding layer, 21 refers to a first bonding layer, 22 refers to a second bonding layer, 3 refers to a ceramic thermal insulation waterproof layer, 4 refers to a cement block, and 5 refers to a pipe, 6 refers to a screw-thread steel bolt, 7 refers to a greening layer.

DETAILED DESCRIPTION OF THE EMBODIMENTS

The present disclosure will be further described below in conjunction with embodiments and drawings.

Example 1

Figure 1:
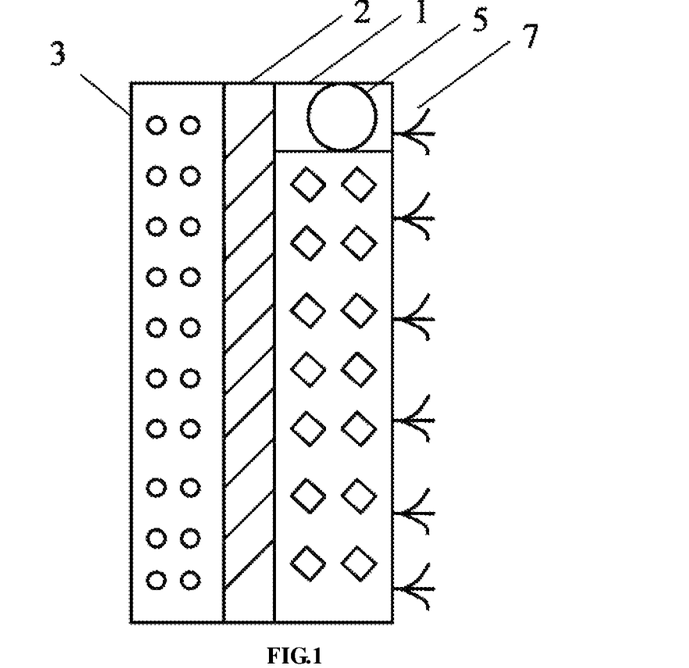
FIG. 1 is a schematic diagram of a first structure of the multifunctional ecological exterior wall of the present disclosure.

The first structure of the multifunctional ecological exterior wall of the present disclosure is shown in FIG. 1. A ceramic thermal insulation waterproof layer 3 is directly used as the wall of a new building, including any one or two or three of, from the inside to the outside, the ceramic thermal insulation waterproof layers 3, a sound-absorbing layer 1, and a water discharging component. The ceramic thermal insulation waterproof layer 3 is bonded to the sound-absorbing layer 1 through a bonding layer 2; a greening layer 7 is located on the surface of the sound-absorbing layer 1; at the upper of the wall of sound-absorbing layer 1, a gap is reserved along the width direction of the sound-absorbing layer (a direction paralleling to the ground), in which a water discharging component is installed to adjust humidity and temperature.

Among them, the ceramic thermal insulation waterproof layer 3 of the first structure includes a closed-cell foam ceramic board with a density of 500 kg/m$^3$ to 700 kg/m$^3$, and a strength and dry density respectively equivalent to that of B07 aerated concrete blocks, which shows functions of thermal insulation, fire prevention, and waterproof when used as the body structure of the wall.

The sound-absorbing layer 1 includes at least two rows of rectangular ceramic sound-absorbing boards which are arranged in parallel along the width direction of the ceramic thermal insulation waterproof layer 3 and laid adjacent to each other on the ceramic thermal insulation waterproof layer 3 in sequence; between the two adjacent rows of ceramic sound-absorbing boards at the upper of the sound-absorbing layer, a gap is reserved to install the water discharging component; the ceramic sound-absorbing board and the bonding layer 2 are penetrated and fixed onto the ceramic thermal insulation waterproof layer 3 by a screw-thread steel bolt 6.

The material of the bonding layer 2 is cement slurry.

The water discharging component includes a pipe made of PVC or a galvanized material and installed in the gap, wherein the pipe is evenly spaced with circular holes with a diameter of 5 mm to 10 mm on its surface, the pipe is closed at one end and is connected to tap water at the other end, and the pipe is externally provided with an electric valve, a temperature sensor and a humidity sensor, which are connected to an external control system, with which the opening and closing of the electric valve is controlled to form drip irrigation water, to adjust the humidity and temperature around the wall.

Further, the water discharging component includes a pipe made of PVC or a galvanized material and installed in the gap, wherein the pipe is evenly spaced with circular holes with a diameter of 5 mm to 10 mm on its surface; the pipe is closed at one end and is connected to the mist outlet of the water storage device at the other end, and the water storage device is fixed onto the external wall by a bracket, is connected to tap water by the water inlet of the water storage device and is provided with an ultrasonic atomizer inside, which is connected to a power source by a wire; the pipe is externally provided with an electric valve, a temperature sensor and a humidity sensor, which are connected to an external control system. After energized, the ultrasonic atomizer atomizes the water and passes it into the pipe, with the external control system, the opening and closing of the electric valve is controlled to form atomized water, to adjust the humidity and temperature around the wall.

The water discharging component includes a pipe made of PVC or galvanized material and installed in the gap, wherein the pipe is evenly spaced with circular holes with a diameter of 5 mm to 10 mm on its surface; the pipe is closed at one end and is connected to one end of the three-way pipe at the other end, while the other two ends of the three-way pipe are connected to the tap water and the mist outlet of a water storage device respectively, and the water storage device is fixed onto the exterior wall by a bracket, is connected to tap water with the water inlet of the water storage device and is provided with an ultrasonic atomizer inside which is connected to a power source by a wire; the pipe is externally provided with an electric valve, a temperature sensor and a humidity sensor, which are connected to an external control system, with which the electric valve is controlled to switch to the tap water or the mist outlet connected to the water storage device as needed, thereby achieving a switch between the drip irrigation water and the atomized water.

The water storage device includes a water tank which is fixed onto a bracket that is fixed onto the wall body by a screw, wherein the water tank is connected to a pipe with the mist outlet of the water tank, and provided with a ceramic ultrasonic atomizer inside, which is connected to a power source.

A moss plant is planted on the surface of the ceramic sound-absorbing board at the corresponding position of the exterior wall according to the requirements of the decorative pattern, forming the greening layer 7.

Figure 2:
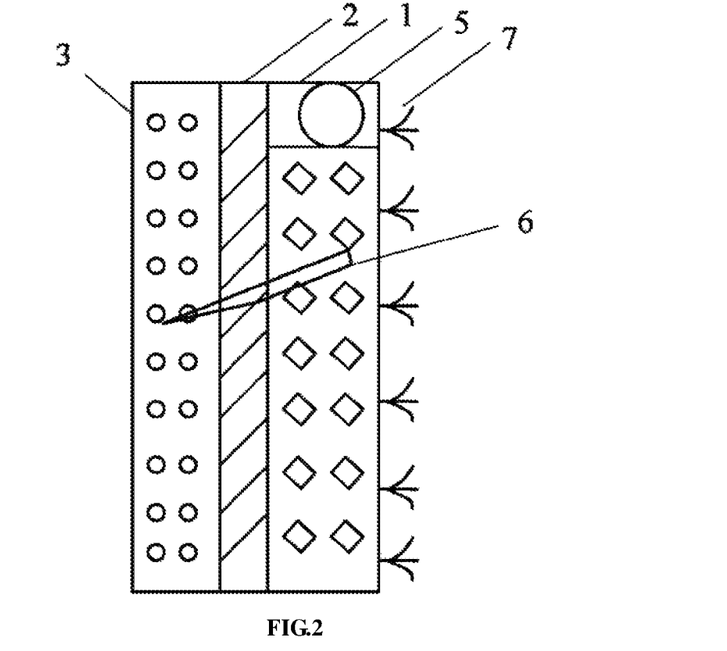
FIG. 2 is a schematic diagram of the positions of the each layer, the pipe, and the screw-thread steel bolt corresponding to the first structure of the multifunctional ecological exterior wall of the present disclosure.

As shown in FIG. 2, an angle between the screw-thread steel bolt 6 and the vertical direction of the ceramic layer 3 is an acute angle, preferably 30° to 75°.

The screw-thread steel bolt 6 is sunk into the sound-absorbing layer 1 for about 1 cm to 2 cm, and the counterbore formed between the screw-thread steel bolt 6 inside the sound-absorbing layer 1 and the outside is sealed with cement slurry.

Example 2

Figure 3:
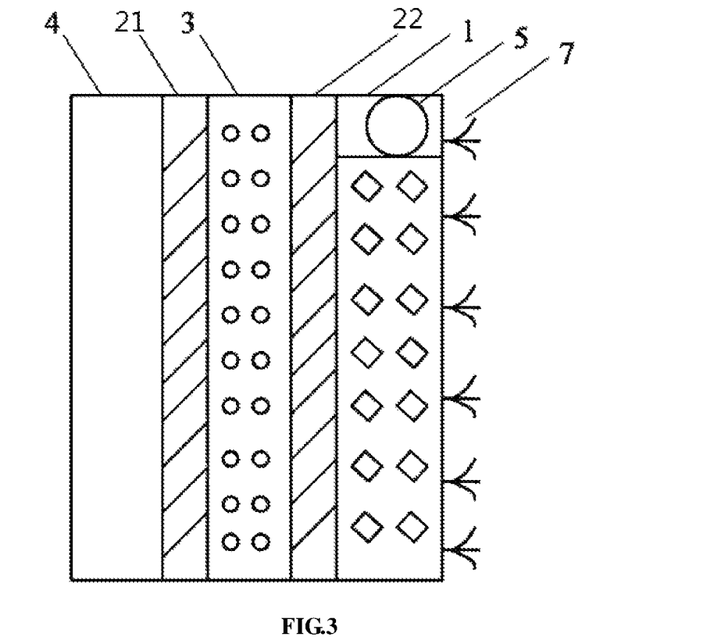
FIG. 3 is a schematic diagram of a second structure of a multifunctional ecological exterior wall of the present disclosure.

The second structure of the multifunctional ecological exterior wall of the present disclosure is shown in FIG. 3. The multifunctional ecological exterior wall also includes the cement block 4 and the greening layer, wherein the inner side of the ceramic thermal insulation waterproof layer 3 is bonded to the surface of the cement block 4 through the bonding layer 21; the outer side of the ceramic thermal insulation waterproof layer 3 is bonded to the sound-absorbing layer 1 through the bonding layer 22; the greening layer is located on the surface of the sound-absorbing layer 1. A gap is reserved along the width direction of the sound-absorbing layer (a direction paralleling to the ground) at the upper of the wall of the sound-absorbing layer 1, in which a water discharging component is installed to adjust the humidity and temperature.

Among them, the ceramic thermal insulation waterproof layer 3 includes a closed-cell foam ceramic board with a density of 150 kg/m³ to 300 kg/m³, which is used for thermal insulation.

The material of the bonding layer 2 is cement slurry.

The sound-absorbing layer 1 includes at least two rows of rectangular ceramic sound-absorbing boards, which are arranged in parallel along the width direction of the ceramic thermal insulation waterproof layer 3, and laid adjacent to each other on the ceramic thermal insulation waterproof layer 3 in sequence; between the two adjacent rows of ceramic sound-absorbing boards at the upper of the sound-absorbing layer, a gap is reserved to install the water discharging component; the ceramic sound-absorbing board is penetrated and fixed onto the cement block 4 by the screw-thread steel bolt 6 that penetrates two the bonding layers 21 and 22 and the ceramic thermal insulation waterproof layer 3.

The water discharging component includes a pipe made of PVC or galvanized material and installed in the gap, wherein the pipe is evenly spaced with circular holes with a diameter of 5 mm to 10 mm on its surface, the pipe is closed at one end and is connected to tap water at the other end, and the pipe is externally provided with an electric valve, a temperature sensor and a humidity sensor, which are connected to an external control system, with which the opening and closing of the electric valve is controlled to form drip irrigation water, to adjust the humidity and temperature around the wall.

Further, the water discharging component includes a pipe made of PVC or a galvanized material and installed in the gap, wherein the pipe is evenly spaced with circular holes with a diameter of 5 mm to 10 mm on its surface; the pipe is closed at one end and is connected to the mist outlet of the water storage device at the other end, and the water storage device is fixed onto the external wall by a bracket, is connected to tap water by the water inlet of the water storage device and is provided with an ultrasonic atomizer inside, which is connected to a power source by a wire; the pipe is externally provided with an electric valve, a temperature sensor and a humidity sensor, which are connected to an external control system. After energized, the ultrasonic atomizer atomizes the water and passes it into the pipe, with the external control system, the opening and closing of the electric valve is controlled to form atomized water, to adjust the humidity and temperature around the wall.

The water discharging component includes a pipe made of PVC or galvanized material and installed in the gap, wherein the pipe is evenly spaced with circular holes with a diameter of 5 mm to 10 mm on its surface; the pipe is closed at one end and is connected to one end of the three-way pipe at the other end, while the other two ends of the three-way pipe are connected to the tap water and the mist outlet of the water storage device respectively, and the water storage device is fixed onto the exterior wall by a bracket, is connected to tap water with the water inlet of the water storage device and is provided an ultrasonic atomizer inside which is connected to a power source by a wire; the pipe is externally provided with an electric valve, a temperature sensor and a humidity sensor, which are connected to an external control system, with which the electric valve is controlled to switch to the tap water or the mist outlet connected to the water storage device as needed, thereby achieving a switch between the drip irrigation water and the atomized water.

According to changes of ambient humidity and the temperature of the exterior wall, the humidity of the air on the side of the exterior wall is automatically adjusted, so that the exterior wall has the function of "breathing" and at the same time plays the role of keeping indoor temperature constant; the pipe diameter, the pore size on the surface of the pipe, and the hole distribution density are determined by the pressure of the water source on the wall; the humidity is controlled and adjusted with the air humidity sensor and the temperature sensor. The water outlet of the pipe network can be in the form of drip irrigation or spraying as required.

A moss plant is planted on the surface of the ceramic sound-absorbing board at the corresponding position of the exterior wall according to the requirements of the decorative pattern, forming the greening layer 7.

Figure 4:
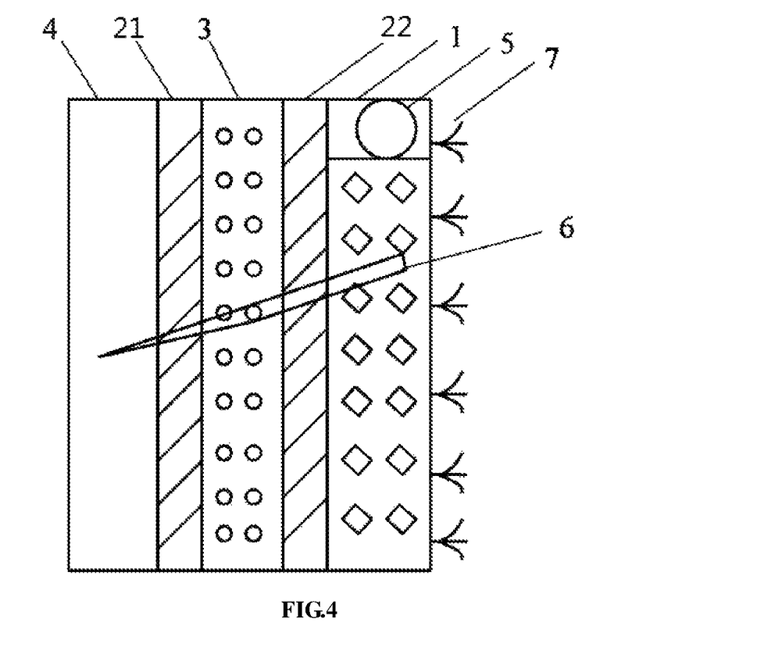
FIG. 4 is a schematic diagram of the positions of the each layer, the pipe, and the screw-thread steel bolt corresponding to the second structure of the multifunctional ecological exterior wall of the present disclosure.
Figure 5:
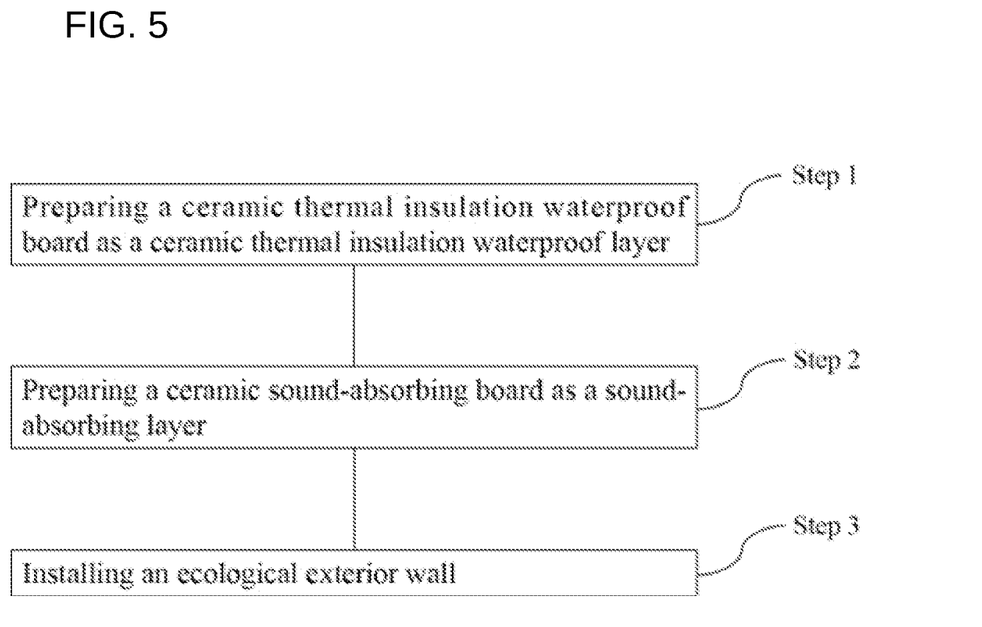
FIG. 5 is a flow chart of the method for preparing a multifunctional ecological exterior wall according to an embodiment of the present application.
Figure 6:
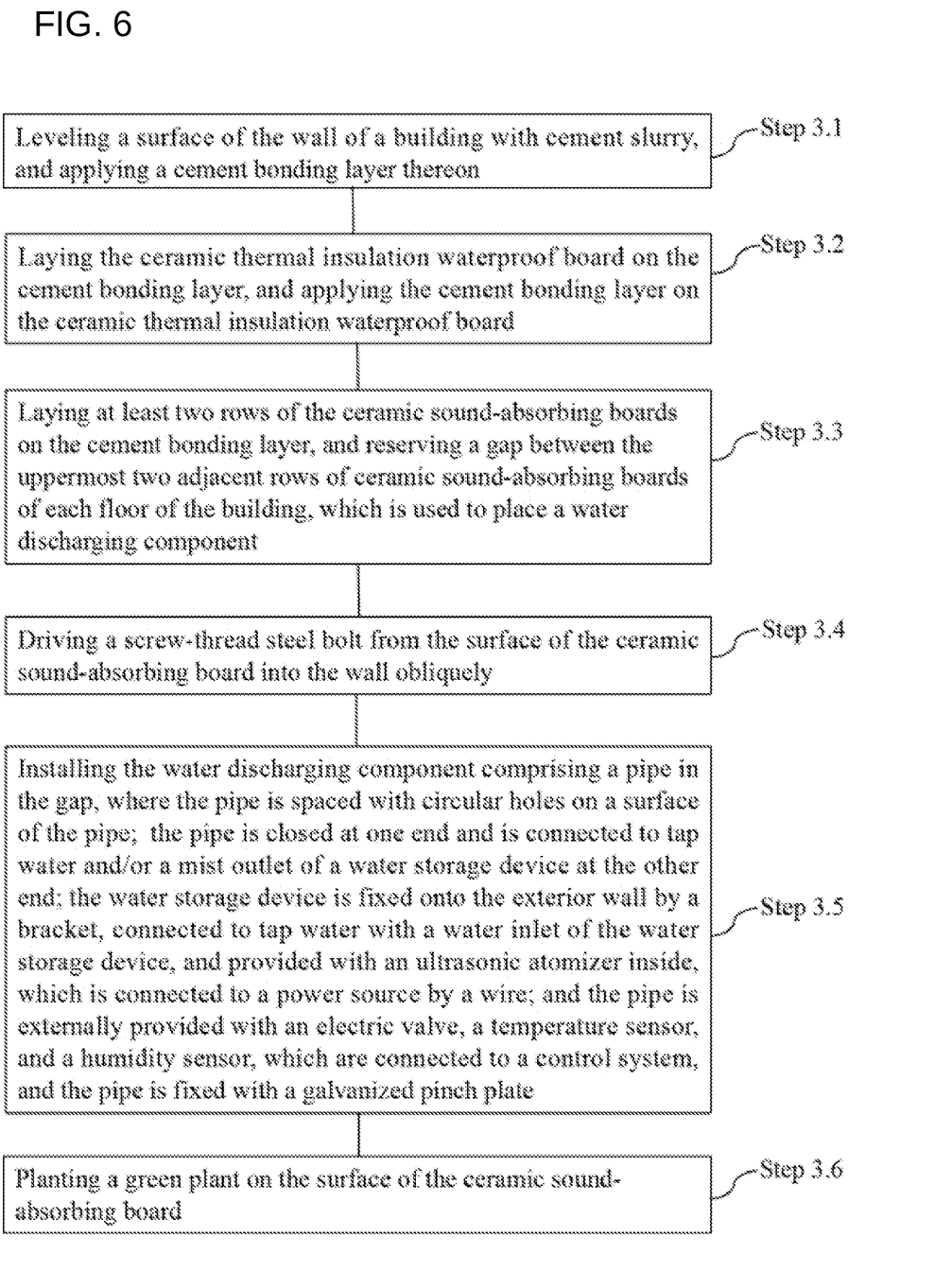
FIG. 6 is a flow chart of the method for installing an ecological exterior wall according to an embodiment of the present application.
Figure 7:
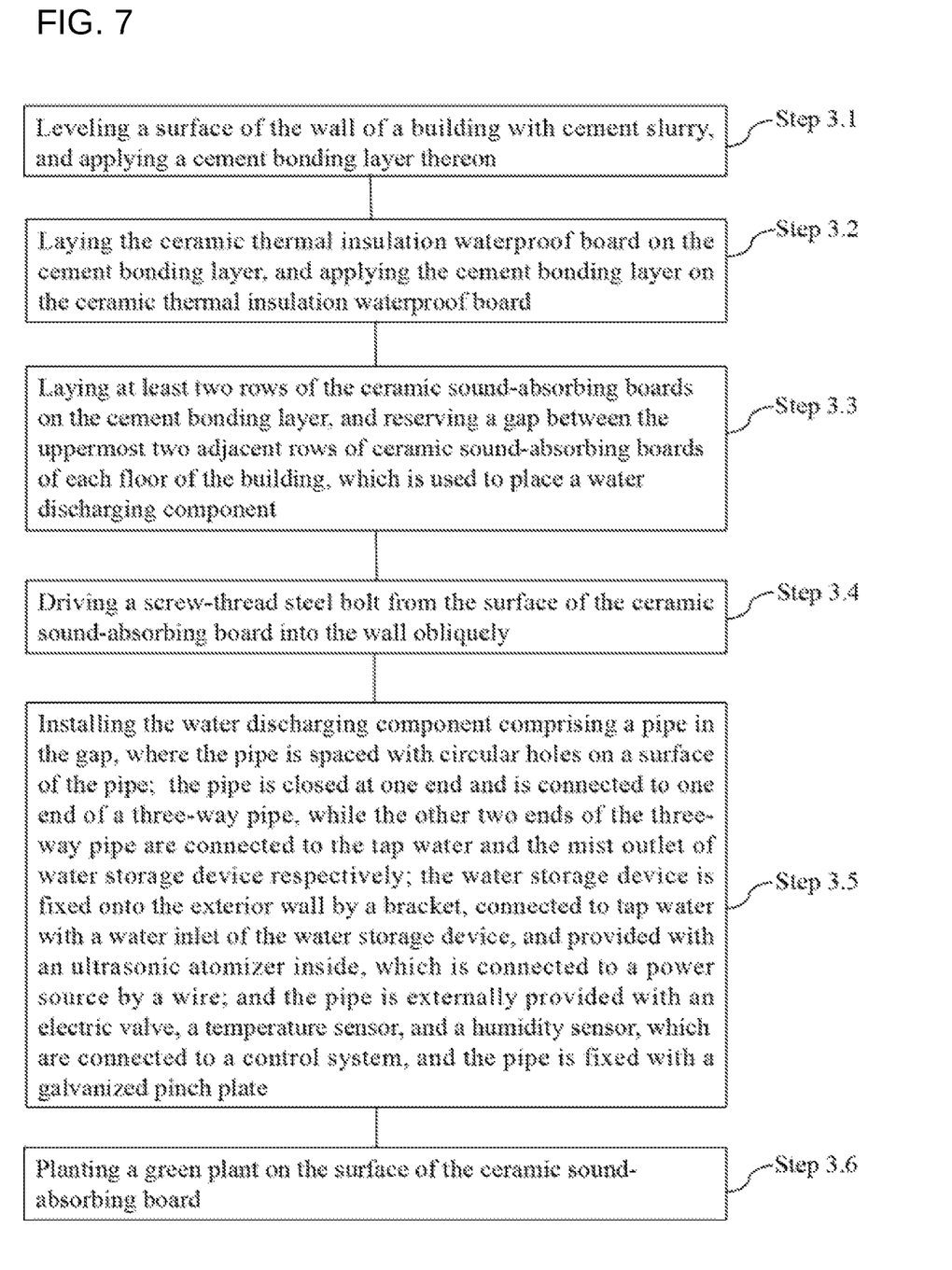
FIG. 7 is a flow chart of the method for installing an ecological exterior wall according to another embodiment of the present application.

As shown in FIG. 4, an angle between the screw-thread steel bolt 6 and the vertical direction of the ceramic layer 3 or the cement block 4 is an acute angle, preferably 30° to 75°.

The screw-thread steel bolt 6 is sunk into the sound-absorbing layer 1 for about 1 cm to 2 cm, and the counterbore formed between the screw-thread steel bolt 6 inside the sound-absorbing layer 1 and the outside is sealed with cement slurry.

The ecological exterior wall system of the present disclosure can be used in new buildings to form the multifunctional ecological external wall which includes an exterior wall (a closed-cell foam ceramic layer with functions of thermal insulation, fire prevention, and waterproof with a density of 500 kg/m³ to 700 kg/m³), a bonding layer, a sound-absorbing material layer, a drip irrigation (spray) pipe for adjusting the ambient humidity and the temperature of the exterior wall, and a greening layer of moss, and also can be used as an energy-saving and thermal insulation decoration for a ordinary exterior wall of new buildings and existing buildings, to form the multifunctional ecological external wall which includes an ordinary exterior wall; a bonding layer; a closed-cell foam ceramic layer with functions of thermal insulation, fire prevention, and waterproof layer with a density of 150 kg/m³ to 300 kg/m³; a bonding layer; a sound-absorbing material layer; a drip irrigation (spray) pipe for adjusting the ambient humidity and the temperature of the exterior wall; and a greening layer of moss. The present disclosure can take the closed-cell foam ceramic layer with functions of thermal insulation, fire prevention, and waterproof; the ceramic sound-absorbing material; and the water automatic drip irrigation (spray) pipe for adjusting the ambient humidity and the temperature of the exterior wall as the core, which could be combined as required.

The multifunctional ecological exterior wall of the present disclosure is simple in structure, and integrates the functions of thermal insulation, fire prevention, waterproof, sound-absorbing and noise reduction, air humidity adjustment, increase of negative oxygen ions, decoration and greening, and dust-absorbing, which is an excellent environmentally-friendly material system.

When used as a thermal insulation exterior wall, the exiting rock wool is easy to absorb water and has a loose structure, and polystyrene board is easy to burn and has a short service life. Compared with those, both the thermal insulation layer and the sound-absorbing layer of the ecological exterior wall of the present disclosure are made of inorganic sintered materials, have a stable structure, excellent and stable performance, and have the same life span as the building.

The ecological exterior wall material of the present disclosure is made of fly ash, coal gangue solid waste and easily available ordinary materials, which not only protects the environment, but also greatly reduces costs, saves resources, and makes it easy to industrialize and marketize, which can be vigorously promoted and used.

The method for preparing the multifunctional ecological exterior wall of the present disclosure includes the following steps:

step 1: preparation of the closed-cell foam ceramic board of the ceramic thermal insulation waterproof layer;

step 1 was specified as follows:

step 1.1: 22%-27% by weight of fly ash, 13%-18% by weight of coal gangue, 8%-12% by weight of red mud, 40%-45% by weight of shale, 5%-10% by weight of feldspar powder and 0.2%-2% by weight of a composite foaming agent were provided for use;

the composite foaming agent in step 1.1 includes any combination of calcium carbonate, calcium sulfate and silicon carbide in any ratio;

step 1.2: the coal gangue and the shale were crushed respectively with a crusher to particles with a particle size of less than 3 mm, then the particles were introduced into a ball mill together with fly ash, red mud, feldspar powder, the composite foaming agent and water, and the resulting mixture were ball milled, and sieved with a 200-mesh sieve, to obtain a powdered material;

step 1.3: the powdered material obtained in step 1.2 was spray dried and granulated, to obtain a dried particle;

step 1.4: the dried particle obtained in step 1.3 was loaded into a refractory mold, and the mold was sent into a kiln for calcining, to obtain a closed-cell foam ceramic board; the calcining in the kiln in step 1.4 was performed at a temperature of 1150° C. to 1200° C.;

step 1.5: the calcined closed-cell foam ceramic was cut according to the required specifications to obtain a finished product;

step 2: preparation of the ceramic sound-absorbing board of the sound-absorbing layer;

step 2 was specified as follows:

step 2.1: 22%-27% by weight of fly ash, 13%-18% by weight of coal gangue, 8%-12% by weight of red mud, 40%-45% by weight of shale, 5%-10% by weight of feldspar powder, 0.1%-3% by weight of a composite foaming agent, 0.5%-3% by weight of a bonding agent, 7%-12% by weight of a pore forming agent, 0-1% by weight of a surfactant and 1-7% by weight of coal powder were provided for use, wherein any one or a combination of calcium carbonate, calcium sulfate and silicon carbide in any ratio was used as the foaming agent, any one or a combination of sodium carboxymethyl cellulose and xanthan gum in any ratio was used as the bonding agent, any one or a combination of polystyrene spheres, spherical plastic particles and spherical activated carbon in any ratio was used as the pore forming agent, and polyvinyl alcohol was used as the surfactant;

step 2.2: coal gangue and shale were crushed respectively with a crusher to particles with a particle size of ≤3 mm, then the particles were introduced into a ball mill together with the fly ash, red mud, feldspar powder, the bonding agent and the composite foaming agent, and the resulting mixture was ball milled, and sieved with a 200-mesh sieve, to obtain a mixed powder A; the mixed powder A was mixed with coal powder in a blender to obtain a mixed powder B;

step 2.3: the surfactant was dissolved in water to obtain a colloid with a mass concentration of 10% to 12%, and the colloid and the pore forming agent were mixed in a ratio of 1:30 to 1:60 by volume to obtain a viscose pore forming agent;

step 2.4: the mixed powder B was added to the viscose pore forming agent, during this period, water was added with a continuous stirring to obtain a spherical particle uniformly coated with the mixed powder B;

step 2.5: the spherical particle obtained in step 2.4 was injected into a mold, pressed lightly to make the particles close to each other, and dried naturally until that the particles have a certain strength, then released from the mold, to obtain a semi-dry blank (with a moisture content of 15-25%);

step 2.6: the semi-dry blank was punched by a nail plate punching machine, with a hole spacing of about 1 cm to 5 cm, and then dried at a temperature of 80° C. to 90° C. to obtain a hard blank;

step 2.7: the hard blank was calcined in a kiln at a temperature of 1150° C. to 1200° C. for 20 min to 60 min, and then was cooled naturally to obtain an ecological ceramic material with various sound-absorbing structures;

step 2.8: the ecological ceramic material obtained by calcining was cut to obtain a ceramic sound-absorbing board of the sound-absorbing layer;

step 3: installation of the ecological exterior wall:

step 3.1: the surface of the wall of a building was leveled with cement slurry, and then a cement bonding layer was applied thereon;

the wall of the building in step 3.1 includes, but is not limited to, closed-cell foam ceramic boards with a density of 500 kg/m³ to 700 kg/m³ or cement blocks;

step 3.2: the ceramic thermal insulation waterproof board was laid on the cement bonding layer, and the cement bonding layer was laid on the ceramic thermal insulation waterproof board;

step 3.3: the ceramic sound-absorbing board of the sound-absorbing layer was laid on the cement bonding layer, and a gap of 3 cm to 5 cm was reserved between the uppermost two adjacent rows of ceramic sound-absorbing boards of each floor of the building, which was used to place a water discharging component for adjusting humidity and temperature;

step 3.4: the screw-thread steel bolt was driven from the surface of the ceramic sound-absorbing board of the sound-absorbing layer into the wall obliquely; the angle between the screw-thread steel bolt and the wall was an acute angle, preferably 30° to 75°.

step 3.5: the water discharging component comprising a pipe made of PVC or a galvanized material was installed in a gap, which is reserved at the upper of the ceramic sound-absorbing board of the sound-absorbing layer, wherein the pipe is evenly spaced with circular holes with a diameter of 5 mm to 10 mm on its surface; the pipe is closed at one end and is directly connected to tap water or a mist outlet of a water storage device at the other end; the water storage device is fixed onto the exterior wall by a bracket, is connected to tap water with the water inlet of the water storage device, and is provided with an ultrasonic atomizer inside which is connected to a power source by a wire; the pipe is externally provided with an electric valve, a temperature sensor, and a humidity sensor, which are connected to a control system; the pipe is fixed with a galvanized pinch plate;

further, the one end of the pipe can also be connected to one end of the three-way pipe, while the other two ends of the three-way pipe are connected to the tap water and the mist outlet of water storage device respectively;

step 3.6: green plants were planted on the surface of the ceramic sound-absorbing board.

Example 3 step 1: preparation of a ceramic thermal insulation waterproof board;

step 1 was specified as follows:

step 1.1: 25% by weight of fly ash, 15% by weight of coal gangue, 10% by weight of red mud, 43% by weight of shale, 7% by weight of feldspar powder and 0.3% by weight of a composite foaming agent were provided for use;

a combination of calcium carbonate and calcium sulfate was used as the composite foaming agent in step 1.1;

step 1.2: coal gangue and shale were crushed respectively with a crusher to particles with a particle size of less than 3 mm, and the particles were introduced into a ball mill together with the fly ash, red mud, feldspar powder, the composite foaming agent and water, and the resulting mixture was ball milled, and sieved with a 200 mesh sieve, to obtain a powdered material;

step 1.3: the powdered material obtained in step 1.2 was spray dried and granulated, to obtain a dried particle;

step 1.4: the dried particle obtained in step 1.3 was loaded into a refractory mold, and the mold was sent into a kiln for calcining, to obtain a closed-cell foam ceramic board;

the calcining in the kiln in step 1.4 was performed at a temperature of 1170° C. for 30 min;

step 1.5: the calcined closed-cell foam ceramic was cut according to the required specifications to obtain a finished product;

the density and compressive strength of the calcined closed-cell foam ceramic were measured as 550 kg/m³ and 6.5 MPa respectively in accordance with GB/T5486-2008. The thermal conductivity of the calcined closed-cell foam ceramic was measured as 0.15 W/(m·k) in accordance with GB/T10294-2008. The material is very suitable for building exterior wall panels;

step 2: preparation of the ceramic sound-absorbing board of the sound-absorbing layer;

step 2 was specified as follows:

step 2.1: 25% by weight of fly ash, 15% by weight of coal gangue, 10% by weight of red mud, 43% by weight of shale, 7% by weight of feldspar powder, 0.5% by weight of silicon carbide, 2% by weight of xanthan gum, 8% by weight of polystyrene spheres (with a diameter of 1 mm to 2 mm), 4% by weight of coal powder (with a particle size of 40 mesh to 60 mesh) and 1% by weight of polyvinyl alcohol were provided for use;

among them, fly ash consisted of the following components by mass percentages: 48% of $SiO_2$, 27% of $Al_2O_3$, 8% of $Fe_2O_3$, 1% of $TiO_2$, 8% of CaO, 1% of MgO, 1% of $K_2O$, and 0.3% of $Na_2O$;

coal gangue consisted of the following components by mass percentages: 43% of $SiO_2$, 27% of $Al_2O_3$, 5% of $Fe_2O_3$, 1% of $TiO_2$, 1% of CaO, 1% of MgO, 1% of $K_2O$, and 0.3% of $Na_2O$;

red mud consisted of the following components by mass percentages: 30% of $SiO_2$, 27% of $Al_2O_3$, 10% of $Fe_2O_3$, 12% of CaO, and 7% of $Na_2O$;

shale consisted of the following components by mass percentages: 57% of $SiO_2$, 17% of $Al_2O_3$, 8% of $Fe_2O_3$, 4% of CaO, 3% of $K_2O$, and 1% of $Na_2O$;

step 2.2: coal gangue and shale were crushed respectively with a crusher to particles with a particle size of ≤3 mm, the particles were introduced into a ball mill together with fly ash, red mud, feldspar powder, a bonding agent and a foaming agent, and the resulting mixture was ball milled, and sieved with a 200-mesh sieve, to obtain a mixed powder A; the mixed powder A was mixed with coal powder in a blender to obtain a mixed powder B;

step 2.3: the surfactant was dissolved in water to obtain a colloid with a mass concentration of 12%, and the colloid and the pore forming agent were mixed in a ratio of 1:40 by volume to obtain a viscose pore forming agent;

step 2.4: the mixed powder B was added to the viscose pore forming agent, and during this period, water was added with a continuous stirring to obtain a spherical particle uniformly coated with the mixed powder B;

step 2.5: the spherical particle obtained in step 2.4 was injected into a mold, pressed lightly to make the particles close to each other, and dried naturally until that the particles have a certain strength, then released from the mold, to obtain a semi-dry blank (with a moisture content of 15-25%);

step 2.6: the semi-dry blank was punched by a nail plate punching machine with a hole spacing of about 1 cm, and then dried at a temperature of 85° C. to obtain a hard blank;

step 2.7: the hard blank was calcined in a kiln at a temperature of 1170° C. for 30 min, then was cooled naturally to obtain an ecological ceramic material with various sound-absorbing structures;

step 2.8: the ecological ceramic material obtained by calcining was cut to obtain the ceramic sound-absorbing board of the sound-absorbing layer;

step 3: installation of the ecological exterior wall of the first structure according to the present disclosure:

step 3.1: the closed-cell foam ceramic board with a density of 550 kg/m$^3$ was built as a wall of a building; the closed-cell foam ceramic board functions as not only a structural layer, but also a thermal insulation layer, a fireproof layer and a waterproof layer;

step 3.2: the surface of the wall was leveled with cement slurry, and then a cement bonding layer was applied thereon;

step 3.3: the ceramic sound-absorbing board of the sound-absorbing layer was laid on the cement bonding layer, and a gap of 3 cm to 5 cm reserved at the uppermost row of ceramic sound-absorbing board of each floor of the building, which was used to place the water discharging component for adjusting humidity and temperature;

step 3.4: the screw-thread steel bolt was driven from the surface of the ceramic sound-absorbing board of the sound-absorbing layer into the wall obliquely; the angle between the screw-thread steel bolt and the wall was 75°, and the screw-thread steel bolt was sunk into the ceramic sound-absorbing board of sound-absorbing layer for about 1 cm, then the top of the anchor rod was sealed with cement;

step 3.5: the water discharging component comprising a pipe made of PVC was installed in the gap, which is reserved at the upper of the ceramic sound-absorbing board of the sound-absorbing layer, wherein the pipe is evenly spaced with circular holes with a diameter of 5 mm on its surface; the pipe is closed at one end and is directly connected to tap water; the pipe is externally provided with an electric valve, a temperature sensor, and a humidity sensor, which are connected to a control system; the pipe is fixed with a galvanized pinch plate;

step 3.6: green plants were planted on the surface of the ceramic sound-absorbing board.

Example 4 step 1: preparation of a ceramic thermal insulation waterproof board;

step 1.1: 22% by weight of fly ash, 13% by weight of coal gangue, 8% by weight of red mud, 40% by weight of shale, 5% by weight of feldspar powder and 1% by weight of composite foaming agent were provided for use;

a combination of silicon carbide and calcium sulfate was used as the composite foaming agent in step 1.1;

step 1.2: coal gangue and shale were crushed respectively with a crusher to particles with a particle size of less than 3 mm, the particles were introduced into a ball mill together with fly ash, red mud, feldspar powder, the composite foaming agent and water, and the resulting mixture was ball milled, and sieved with a 200-mesh sieve, to obtain a powdered material;

step 1.3: the powdered material obtained in step 1.2 was spray dried and granulated, to obtain a dried particle;

step 1.4: the dried particle obtained in step 1.3 was loaded into a refractory mold, and the mold was sent into a kiln for calcining to obtain a closed-cell foam ceramic board;

the calcining in kiln in step 1.4 was performed at a temperature of 1150° C. for 45 min;

step 1.5: the calcined closed-cell foam ceramic was cut according to the required specifications to obtain a finished product;

the density and compressive strength of the calcined closed-cell foam ceramic were measured as 200 kg/m$^3$ and 1.5 MPa respectively in accordance with GB/T5486-2008. The thermal conductivity of the calcined closed-cell foam ceramic was measured as 0.08 W/(m·k) in accordance with GB/T10294-2008. The material is very suitable for building exterior wall thermal insulation panels;

step 2: preparation of the ceramic sound-absorbing board of the sound-absorbing layer;

step 2 was specified as follows:

step 2.1: 22% by weight of fly ash, 14% by weight of coal gangue, 8% by weight of red mud, 45% by weight of shale, 5% by weight of feldspar powder, 1% by weight of a mixture of silicon carbide and calcium carbonate, 1% by weight of sodium carboxymethyl cellulose, 8% by weight of spherical plastic particles (with a diameter of 2 mm to 3 mm), 4% by weight of coal powder (with a particle of 40 mesh to 60 mesh) and 0.3% by weight of polyvinyl alcohol were provided for use;

among them, fly ash consisted of the following components by mass percentage: 45% of $SiO_2$, 25% of $Al_2O_3$, 5% of $Fe_2O_3$, 0.5% of $TiO_2$, 5% of CaO, 0.5% of MgO, 0.5% of $K_2O$, and 0.1% of $Na_2O$, coal gangue consisted of the following components by mass percentage: 40% of $SiO_2$, 25% of $Al_2O_3$, 3% of $Fe_2O_3$, 0.5% of $TiO_2$, 0.5% of CaO, 0.5% of MgO, 0.5% of $K_2O$, and 0.1% of $Na_2O$, red mud consisted of the following components by mass percentage: 20% of $SiO_2$, 25% of $Al_2O_3$, 8% of $Fe_2O_3$, 9% of CaO, and 6% of $Na_2O$, and shale consisted of the following components by mass percentage: 55% of $SiO_2$, 15% of $Al_2O_3$, 5% of $Fe_2O_3$, 3% of CaO, 2% of $K_2O$, and 0.5% of $Na_2O$;

step 2.2, coal gangue and shale were crushed respectively with a crusher to particles with a particle size of ≤3 mm, then the particles were introduced into a ball mill together with fly ash, red mud, feldspar powder, a bonding agent and a foaming agent, and the resulting mixture was ball milled, and sieved with a 200-mesh sieve, to obtain a mixed powder A; the mixed powder A was mixed with coal powder in a blender to obtain a mixed powder B;

step 2.3: the surfactant was dissolved in water to obtain a colloid with a mass concentration of 12%, and the colloid and a pore forming agent were mixed in a ratio of 1:30 by volume to obtain a viscose pore forming agent;

step 2.4: the mixed powder B was added to the viscose pore forming agent, during this period, water was added with a continuous stirring, to obtain a spherical particle uniformly coated with the mixed powder B;

step 2.5: the spherical particle obtained in step 2.4 was injected into a mold, pressed lightly to make the particles close to each other, and dried naturally until that the particles have a certain strength, and then released from the mold to obtain a semi-dry blank (with a moisture content of 15-25%);

step 2.6: the semi-dry blank was punched by a nail plate punching machine with a hole spacing of about 3 cm, and then dried at a temperature of 80° C. to obtain a hard blank;

step 2.7: the hard blank was calcined in a kiln at a temperature of 1170° C. for 30 min, and then was cooled naturally to obtain an ecological ceramic material with various sound-absorbing structures;

step 2.8: the ecological ceramic material obtained after the calcining was cut to obtain a ceramic sound-absorbing board of the sound-absorbing layer;

step 3: installation of the ecological exterior wall of the first structure according to the present disclosure:

step 3.1: the closed-cell foam ceramic board with a density of 550 kg/m$^3$ was built as a wall of a building; the closed-cell foam ceramic board functions as not only a structural layer, but also a thermal insulation layer, a fireproof layer and a waterproof layer;

step 3.2: the surface of the wall was leveled with cement slurry, and then a cement bonding layer was applied thereon;

step 3.3: the ceramic sound-absorbing board of the sound-absorbing layer was laid on the cement bonding layer, and a gap of 3 cm to 5 cm was reserved between the uppermost two adjacent rows of ceramic sound-absorbing boards of each floor of the building, which was used to place the water discharging component for adjusting humidity and temperature;

step 3.4: the screw-thread steel bolt was driven from the surface of the ceramic board of the sound-absorbing layer into the wall obliquely; the angle between the screw-thread steel bolt and the wall was 45°, and the screw-thread steel bolt was sunk into the ceramic board of the sound-absorbing layer for about 1 cm, then the top of the anchor rod was sealed with cement;

step 3.5: the water discharging component comprising a galvanized pipe was installed in the gap, which is reserved at the upper of the ceramic sound-absorbing board of the sound-absorbing layer, wherein the pipe is evenly spaced with circular holes with a diameter of 10 mm on its surface; the pipe is closed at one end and is directly connected to a mist outlet of a water storage device at the other end; the water storage device is fixed onto the exterior wall by a bracket, is connected to tap water with the water inlet of the water storage device, and is provided with an ultrasonic atomizer inside which is connected to a power source by a wire; the pipe is externally provided with an electric valve, a temperature sensor, and a humidity sensor, which are connected to a control system; the pipe is fixed with a galvanized pinch plate;

step 3.6: green plants were planted on the surface of the ceramic sound-absorbing board.

Example 5 step 1: preparation of a ceramic thermal insulation waterproof board;

step 1.1: 27% by weight of fly ash, 18% by weight of coal gangue, 12% by weight of red mud, 45% by weight of shale, 10% by weight of feldspar powder and 2% by weight of a composite foaming agent were provided for use;

a combination of silicon carbide and calcium carbonate was used as the composite foaming agent in step 1.1;

step 1.2: coal gangue and shale were crushed respectively with a crusher to particles with a particle size of less than 3 mm, the particles were introduced into a ball mill together with the fly ash, red mud, feldspar powder, the composite foaming agent and water, and the resulting mixture was ball milled, and sieved with a 200-mesh sieve, to obtain a powdered material;

step 1.3: the powdered material obtained in step 1.2 was spray dried and granulated, to obtain a dried particle;

step 1.4: the dried particle obtained in step 1.3 was loaded into a refractory mold, and the mold was sent into a kiln for calcining to obtain a closed-cell foam ceramic board;

the calcining in kiln in step 1.4 was performed at a temperature of 1200° C. for 60 min;

step 1.5: the calcined closed-cell foam ceramic was cut according to the required specifications to obtain a finished product;

the density and compressive strength of the calcined closed-cell foam ceramic were measured as 700 kg/m$^3$ and 4.5 MPa respectively in accordance with GB/T5486-2008. The thermal conductivity of the calcined closed-cell foam ceramic was measured as 0.25 W/(m·k) in accordance with GB/T10294-2008. The material is very suitable for building exterior wall thermal insulation panels;

step 2: preparation of a ceramic sound-absorbing board of the sound-absorbing layer;

step 2 was specified as follows:

step 2.1: 27% by weight of fly ash, 18% by weight of coal gangue, 12% by weight of red mud, 40% by weight of shale, 10% by weight of feldspar powder, 2% by weight of a mixture of silicon carbide and calcium sulfate, 3% by weight of a mixture of sodium carboxymethyl cellulose and xanthan gum, 10% by weight of spherical activated carbon (with a diameter of 1 mm to 3 mm), 0.5% by weight of polyvinyl alcohol were provided for use;

among them, fly ash consisted of the following components by mass percentage: 50% of $SiO_2$, 30% of $Al_2O_3$, 10% of $Fe_2O_3$, 1.5% of $TiO_2$, 10% of CaO, 1.5% of MgO, 1.5% of $K_2O$, and 0.5% of $Na_2O$, coal gangue consisted of the following components by mass percentage: 45% of $SiO_2$, 30% of $Al_2O_3$, 8% of $Fe_2O_3$, 1.5% of $TiO_2$, 1.5% of CaO, 1.5% of MgO, 1.5% of $K_2O$, and 0.5% of $Na_2O$, red mud consisted of the following components by mass percentage: 50% of $SiO_2$, 30% of $Al_2O_3$, 13% of $Fe_2O_3$, 14% of CaO, and 9% of $Na_2O$, shale consisted of the following components by mass percentage: 60% of $SiO_2$, 20% of $Al_2O_3$, 10% of $Fe_2O_3$, 5% of CaO, 4% of $K_2O$, and 1.5% of $Na_2O$;

step 2.2: coal gangue and shale were crushed respectively with a crusher to particles with a particle size of less than 3 mm, and the particles were introduced into a ball mill together with fly ash, red mud, feldspar powder, a bonding agent and a composite foaming agent, and the resulting mixture was ball milled, and then sieved with a 200-mesh sieve, to obtain a mixed powder A; the mixed powder A was mixed with coal powder in a blender to obtain a mixed powder B;

step 2.3: the surfactant was dissolved in water to obtain a colloid with a mass concentration of 15%, and the colloid and the pore forming agent were mixed in a ratio of 1:60 by volume to obtain a viscose pore forming agent;

step 2.4: the mixed powder B was added to the viscose pore forming agent, during this period, water was added with a continuous stirring to obtain a spherical particle uniformly coated with the mixed powder B;

step 2.5: the spherical particle obtained in step 2.4 was injected into a mold, pressed lightly to make the particles close to each other, dried naturally until that the particles have a certain strength, and then released from the mold to obtain a semi-dry blank;

step 2.6: the semi-dry blank was punched by a nail plate punching machine with a hole spacing of about 2 cm, and then dried at a temperature of 80° C. to obtain a hard blank;

step 2.7: the hard blank was calcined in a kiln at a temperature of 1200° C. for 60 min, and then was cooled naturally to obtain an ecological ceramic material with various sound-absorbing structures;

step 2.8: the ecological ceramic material obtained by calcining was cut to obtain a ceramic sound-absorbing board of the sound-absorbing layer;

the obtained ecological ceramic material with a variety of sound-absorbing structures was cut and it was found from the cut section that this material is a ceramic material that was composed of countless spherical ceramic bubbles closely packed together, of which any two adjacent ceramic bubbles were connected through the apex, thereby forming numerous curved channels inside the material extending to the surface of the material; the walls of any adjacent ceramic bubbles and their junction areas were filled with tiny open and closed ceramic bubbles; on the surface of the material defined by the length and width dimensions, a tubular pore was provided at an interval of about 1 cm, whose axis is perpendicular to the surface of the material defined by the length and width dimensions;

the sound-absorbing performance, moisture absorption performance, porosity, density and compressive strength of the obtained ecological ceramic materials with various sound-absorbing structures were tested. The material exhibits a noise reduction coefficient of 0.56 as measured in accordance with the Voltage Standing Wave Ratio method (test standard: GB/T18696.1-2004). The water storage rate of the ecological ceramic material was measure as 117 Kg/m$^3$. The porosity and the density of the ecological ceramic material were measure as 83% and 380 kg/m$^3$ respectively in accordance with the drainage method. And the compressive strength of this material was measured as 4.5 MPa.

step 3: installation of the ecological exterior wall of the second structure according to the present disclosure:

step 3.1: the surface of the wall of a building made by cement blocks was leveled with cement slurry, and then a cement bonding layer was applied thereon;

step 3.2: the closed-cell foam ceramic board with a density of 200 kg/m$^3$ of the ceramic thermal insulation waterproof layer was laid on the cement bonding layer, and the cement bonding layer was applied onto the closed-cell foam ceramic board; the cement bonding layer can not only block the gaps between the closed-cell foam ceramic boards, and further strengthen the waterproof, but also can bond the ceramic sound-absorbing boards.

step 3.3: the ceramic sound-absorbing board of the sound-absorbing layer was laid on the cement bonding layer, and a gap of 3 cm to 5 cm was reserved between the uppermost two adjacent rows of ceramic sound-absorbing boards of each floor of the building, which was used to place the water discharging component for adjusting humidity and temperature;

step 3.4: the screw-thread steel bolt was driven from the surface of the ceramic board of the sound-absorbing layer into the wall obliquely; the angle between the screw-thread steel bolt and the wall was 60°, and the screw-thread steel bolt was sunk into the ceramic board of the sound-absorbing layer for about 1 cm, then the top of the anchor rod was sealed with cement;

step 3.5: the water discharging component comprising a pipe made of PVC was installed in the gap, which is reserved at the upper of the ceramic board of the sound-absorbing layer, wherein the pipe is evenly spaced with circular holes with a diameter of 8 mm on its surface; the pipe is closed at one end and is connected to one end of the three-way pipe at the other end, while the other two ends of the three-way pipe are connected respectively to tap water and the mist outlet of the water storage device; the water storage device is fixed onto the exterior wall by a bracket, is connected to tap water by the water inlet of the water storage device, and is provided with an ultrasonic atomizer inside, which is connected to a power source by a wire; the pipe is externally provided with an electric valve, a temperature sensor and a humidity sensor, which are connected to an external control system; the pipe is fixed with a galvanized pinch plate;

step 3.6: green plants were planted on the surface of the ceramic sound-absorbing board.

The description of the above examples is only used to help to understand the method and core idea of the present disclosure. It should be pointed out that for those skilled in the art, without departing from the principle of the present disclosure, several improvements and modifications can be made to the present disclosure, and these improvements and modifications also fall within the protection scope of the claims of the present disclosure. Various modifications to these examples are obvious to those skilled in the art, and the general principles defined herein can be implemented in other examples without departing from the spirit or scope of the present disclosure. Therefore, the present disclosure will not be limited to the examples shown in the disclosure, but should conform to the widest scope consistent with the principles and novel features disclosed in the disclosure.

What is claimed is:

1. A method for preparing a multifunctional ecological exterior wall, comprising:
   step 1: preparing a ceramic thermal insulation waterproof board as a ceramic thermal insulation waterproof layer;
   step 2: preparing a ceramic sound-absorbing board as a sound-absorbing layer;
   step 3: installing an ecological exterior wall:
   step 3.1: leveling a surface of the wall of a building with cement slurry, and applying a cement bonding layer thereon;
   step 3.2: laying the ceramic thermal insulation waterproof board on the cement bonding layer in step 3.1, and applying the cement bonding layer on the ceramic thermal insulation waterproof board;
   step 3.3: laying at least two rows of the ceramic sound-absorbing boards which are arranged in parallel along the direction parallel to the ground and laid adjacent to each other in sequence on the cement bonding layer in step 3.2, and reserving a gap of 3 cm to 5 cm between the ceramic sound-absorbing boards of each floor of a building, which is used to place a water discharging component for adjusting humidity and temperature;
   step 3.4: driving a screw-thread steel bolt from the surface of the ceramic sound-absorbing board into the wall obliquely;
   step 3.5: installing the water discharging component comprising a pipe made of PVC or a galvanized material in the gap reserved at the upper of the ceramic sound-absorbing board; and
   step 3.6: planting a green plant on the surface of the ceramic sound-absorbing board.

2. The method as claimed in claim 1, wherein the wall of the building in step 3.1 includes a closed-cell foam ceramic board with a density of 500 kg/m$^3$ to 700 kg/m$^3$ or a cement block.

3. The method as claimed in claim 1, wherein step 1 is specified as follows:
   step 1.1: providing 22%-27% by weight of fly ash, 13%-18% by weight of coal gangue, 8%-12% by weight of red mud, 40%-45% by weight of shale, 5%-10% by weight of feldspar and 0.2%-2% by weight of a composite foaming agent for use;
   step 1.2: crushing coal gangue and shale respectively with a crusher to particles with a particle size of less than 3 mm, introducing the particles into a ball mill together with fly ash, red mud, feldspar, the composite foaming agent and water, and ball milling the resulting mixture to obtain a powdered material;
   step 1.3: spray drying and granulating the powdered material obtained in step 1.2 to obtain a dried particle;
   step 1.4: loading the dried particle obtained in step 1.3 into a refractory mold, and sending the mold into a kiln for calcining, to obtain a closed-cell foam ceramic board;

step 1.5: cutting the closed-cell foam ceramic board obtained in step 1.4 according to the required specifications, to obtain a ceramic thermal insulation waterproof board.

4. The method as claimed in claim 3, wherein the calcining in the kiln in step 1.4 is performed at a temperature of 1150° C. to 1200° C. for 30 to 60 minutes.

5. The method as claimed in claim 3, wherein the composite foaming agent in step 1.1 includes any combination of calcium carbonate, calcium sulfate and silicon carbide in any ratio.

6. The method as claimed in claim 1, wherein step 2 is specified as follows:
step 2.1: providing 22%-27% by weight of fly ash, 13%-18% by weight of coal gangue, 8%-12% by weight of red mud, 40%-45% by weight of shale, 5%-10% by weight of feldspar powder, 0.1%-3% by weight of a composite foaming agent, 0.5%-3% by weight of a bonding agent, 7%-12% by weight of a pore forming agent, 0-1% by weight of a surfactant and 1-7% by weight of coal powder for use;
step 2.2: crushing coal gangue and shale respectively with a crusher to particles with a particle size of less than 3 mm, mixing the particles with fly ash, red mud, feldspar powder, the bonding agent and the composite foaming agent, and introducing the resulting mixture into a ball mill and ball milling, to obtain a mixed powder A with a fineness of ≥200 mesh; mixing the mixed powder A with coal powder in a blender, to obtain a mixed powder B;
step 2.3: dissolving the surfactant in water to obtain a colloid with a mass concentration of 10% to 12%, and mixing the colloid and the pore forming agent in a ratio of 1: (30-60) by volume, to obtain a viscose pore forming agent;
step 2.4: adding the mixed powder B to the viscose pore forming agent obtained in step 2.3 while adding water with a continuous stirring, to obtain a spherical particle uniformly coated with the mixed powder B;
step 2.5: injecting the spherical particle obtained in step 2.4 into a mold, pressing lightly to make the particles close to each other, drying naturally until that the particles have a certain strength, and releasing the resulting material from the mold, to obtain a semi-dry blank with a moisture content of 15-25%;
step 2.6: punching the semi-dry blank by a nail plate punching machine, with a hole spacing of about 1 cm to 5 cm, and drying the semi-dry blank at a temperature of 80° C. to 90° C. to obtain a hard blank;
step 2.7: calcining the hard blank in a kiln at a temperature of 1150° C. to 1200° C. for 20 min to 60 min, and cooling naturally, to obtain an ecological ceramic material with various sound-absorbing structures;
step 2.8: cutting the ecological ceramic material calcined in step 2.7, to obtain a ceramic sound-absorbing board.

7. The method as claimed in claim 1, wherein the prepared ecological wall comprises, from the inside to the outside, the ceramic thermal insulation waterproof layer, the ceramic sound-absorbing layer and the water discharging component, and further the greening layer; the ceramic thermal insulation waterproof layer is bonded to the ceramic sound-absorbing layer through the bonding layer; the greening layer is located on the surface of the ceramic sound-absorbing layer; and the gap paralleling to the ground is reserved at the upper of the wall of the ceramic sound-absorbing layer, in which the water discharging component is installed to adjust humidity and temperature;
the ceramic sound-absorbing layer includes at least two rows of rectangular ceramic sound-absorbing boards which are arranged in parallel along the direction parallel to the ground and laid adjacent to each other in sequence; between the ceramic sound-absorbing boards, the gap is reserved to install the water discharging component; and
the ceramic thermal insulation waterproof layer comprises a closed-cell foam ceramic board with a density of 500 $kg/m^3$ to 700 $kg/m^3$, which exhibits a strength and dry density respectively equivalent to that of B07 aerated concrete blocks and is used as the body structure of the wall.

8. The method as claimed in claim 1, wherein the prepared ecological wall comprises a cement block, wherein an inner side of the ceramic thermal insulation waterproof layer is directly bonded to the surface of the cement block through the bonding layer;
the ceramic thermal insulation waterproof layer comprises a closed-cell foam ceramic board with a density of 150 $kg/m^3$ to 300 $kg/m^3$; and
the ceramic sound-absorbing board of the ceramic sound-absorbing layer is penetrated and fixed onto the cement block by a screw-thread steel bolt; the screw-thread steel bolt penetrates, from the outside to the inside, the ceramic sound-absorbing layer, the second bonding layer, the ceramic thermal insulation waterproof layer, and the first bonding layer, and fixes onto the cement block.

9. The method as claimed in claim 8, wherein each layer is penetrated and fixed onto the innermost layer by a screw-thread steel bolt, wherein an angle between the screw-thread steel bolt and the vertical direction of the innermost layer is an acute angle, which ranges from 30° to 75°; and
the screw-thread steel bolt is sunk into the outermost wall for about 1 cm to 2 cm, and a counterbore formed between the screw-thread steel bolt inside the outermost wall and the outside is sealed with cement slurry.

* * * * *

UNITED STATES PATENT AND TRADEMARK OFFICE
CERTIFICATE OF CORRECTION

PATENT NO. : 12,018,479 B2
APPLICATION NO. : 17/274243
DATED : June 25, 2024
INVENTOR(S) : Suogui Zhang et al.

It is certified that error appears in the above-identified patent and that said Letters Patent is hereby corrected as shown below:

On the Title Page

In the References Cited, under item (56) Foreign Patent Documents, please add:
CN 205637630-U 10/2016
CN 218779714-U 03/2023

Signed and Sealed this
Third Day of September, 2024

Katherine Kelly Vidal
*Director of the United States Patent and Trademark Office*